(12) United States Patent
Morton et al.

(10) Patent No.: US 10,277,324 B2
(45) Date of Patent: Apr. 30, 2019

(54) SILICON PHOTONICS RECEIVE PHASED ARRAY SENSORS

(71) Applicant: Morton Photonics, West Friendship, MD (US)

(72) Inventors: Paul A. Morton, West Friendship, MD (US); Jacob Khurgin, Pikesville, MD (US)

(73) Assignee: Morton Photonics, West Friendship, MD (US)

( * ) Notice: Subject to any disclaimer, the term of this patent is extended or adjusted under 35 U.S.C. 154(b) by 0 days.

(21) Appl. No.: 16/156,087

(22) Filed: Oct. 10, 2018

(65) Prior Publication Data

US 2019/0097725 A1 Mar. 28, 2019

Related U.S. Application Data

(63) Continuation of application No. 16/156,087, filed on Oct. 10, 2018, which is a continuation of application No. 15/399,563, filed on Jan. 5, 2017, now Pat. No. 10,128,952.

(60) Provisional application No. 62/274,904, filed on Jan. 5, 2016.

(51) Int. Cl.
*H01Q 3/26* (2006.01)
*H04Q 5/00* (2006.01)
*H04B 10/40* (2013.01)
*H04B 10/50* (2013.01)
*H04Q 11/00* (2006.01)
*H04B 10/516* (2013.01)
(Continued)

(52) U.S. Cl.
CPC ..... *H04B 10/25759* (2013.01); *H01Q 3/2676* (2013.01); *H04B 10/50* (2013.01); *H04B 10/516* (2013.01); *H04B 2210/006* (2013.01); *H04Q 5/00* (2013.01); *H04Q 11/00* (2013.01)

(58) Field of Classification Search
None
See application file for complete search history.

(56) References Cited

U.S. PATENT DOCUMENTS

| 4,736,463 A | * | 4/1988 | Chavez | H01Q 3/34 342/367 |
| 2009/0002236 A1 | * | 1/2009 | Zhou | H01Q 1/28 342/375 |
| 2014/0218240 A1 | * | 8/2014 | Kpodzo | G01S 19/21 342/450 |

* cited by examiner

*Primary Examiner* — Darren E Wolf
(74) *Attorney, Agent, or Firm* — Nadya Reingand; Yan Hunkin

(57) ABSTRACT

High-performance ultra-wideband Phased Array Sensors (PAS) are disclosed, which have unique capabilities, enabled through photonic integrated circuits and novel optical architectures. Unique capabilities for a Receive PAS are provided by wafer scale photonic integration including heterogeneous integration of III-V materials and ultra-low-loss silicon nitride waveguides, combining key component technologies into complex PIC devices. Novel aspects include optical multiplexing combining wavelength division multiplexing and/or a novel extension to array photodetectors providing the capability to combine many RF photonic signals with very low loss. The architecture also includes optical down-conversion, as well as digital signal processing to improve the linearity of the system. Simultaneous multi-channel beamforming is achieved through optical power splitting of optical signals to create multiple exact replicas of the signals that are then processed independently.

20 Claims, 17 Drawing Sheets

(51) Int. Cl.
*H04B 10/2575* (2013.01)
*H04B 10/25* (2013.01)

| MCSB-PIC #1 | MCSB-PIC #2 | MCSB-PIC #3 | MCSB-PIC #4 |
|---|---|---|---|
| MCSB-PIC #5 | MCSB-PIC #6 | MCSB-PIC #7 | MCSB-PIC #8 |
| MCSB-PIC #9 | MCSB-PIC #10 | MCSB-PIC #11 | MCSB-PIC #12 |
| MCSB-PIC #13 | MCSB-PIC #14 | MCSB-PIC #15 | MCSB-PIC #16 |

SILICON PHOTONICS RECEIVE PHASED ARRAY SENSORS

CROSS-REFERENCE TO RELATED APPLICATIONS

This patent application is a continuation of the U.S. patent application Ser. No. 15/399,563 "SILICON PHOTONICS RECEIVE PHASED ARRAY SENSORS" filed on Jan. 5, 2017, which claims priority to U.S. provisional patent application No. 62/274,904 "HETEROGENEOUSLY INTEGRATED WAFER SCALE SILICON PHOTONICS FOR RECEIVE PHASED ARRAY SENSORS" filed on Jan. 5, 2016, all of them fully incorporated herein by reference.

STATEMENT REGARDING FEDERAL SPONSORED RESEARCH AND DEVELOPMENT

This invention was made with U.S. Government support under Contract FA8650-15-C-1863, an Air Force SBIR Project, and the U.S. Government has certain rights in the invention.

FIELD OF INVENTION

This invention relates to high performance active radio frequency (RF) phased array antenna systems, RF beamforming systems, RF down-converter and channelizer systems, and RF photonics systems, enabled by photonic integrated circuit (PIC) devices.

BACKGROUND

CMOS foundry based silicon photonics devices provide the opportunity for high volume, low cost devices; ideal candidates for use in Phased Array Sensor (PAS) systems, which require processing for 1000's of elements per antenna, supporting the use of large array Photonic Integrated Circuit (PIC) devices. Advances in photonic integration, including heterogeneous integration of III-V materials to fabricate lasers, linear modulators, and photodetectors; ultra-low-loss silicon nitride waveguides for high performance filters and time delay devices; and heterogeneous integration of magneto optic materials to create optical isolators; enable the design and fabrication of complex PIC devices that can provide unique capabilities for PAS systems that cannot be obtained with electronic technologies. This invention utilizes these advanced photonic devices integrated onto large size (wafer scale) PIC devices to enable a future generation of advanced PAS systems.

SUMMARY

This section highlights some of the key requirements for future Receive (Rx)-PAS systems, and how these can be achieved using PIC technology and novel photonic architectures. Advanced PIC based Rx-PAS systems can provide unique capabilities, including;
1. Ultra-Wideband Operation, with;
2. Multiple Channel Simultaneous RF Beamforming
3. Optical Gain
4. Optical Down-Conversion
5. True Time Delay
6. Tunable Optical Rejection of Interfering Signals
7. Optically Generated Ultra-Wideband Local Oscillator
8. Channelizer functionality Ultra-Wideband Operation over very large frequency ranges, e.g. 1-40 GHz, as well as large instantaneous bandwidth, 1 GHz and higher, while also providing the following unique capabilities;

Multiple Channel Simultaneous RF Beamforming is the equivalent of having multiple separate complete electronic Rx-PAS systems all housed within a single Rx-PAS. This is achieved in this novel architecture through optical power splitting of the RF and Local Oscillator (LO) optical signals to create multiple exact replicas of the signals that are then processed independently within the PIC device.

Optical Gain in the Rx-PAS architecture provides scaling of optical performance with the number of antenna elements, taking advantage of the large number of antenna elements for high optical gain. This gain can overcome the initial conversion loss from electronic to photonic signals, support the optical splitting required for multiple channel simultaneous RF beamforming, and support high spurious free dynamic range (SFDR) system operation.

Optical Down-Conversion is a photonic capability that converts a chosen frequency band down to the IF band by simply replacing the optical carrier with an optical LO carrier at the appropriate frequency. This overcomes the large mixing spurs that occur using electronic mixers that significantly degrade SFDR in wide instantaneous bandwidth systems.

True Time Delay devices with large tunable delay, wide bandwidth and high system SFDR based on ultra-low loss silicon nitride waveguides and microresonators.

Tunable Optical Rejection of Interfering Signals across the full bandwidth of future PAS systems can be provided by ultra-high-Q optical microresonator filters designed in silicon nitride waveguides. This capability can be used to eliminate co-site interference or jamming signals from an adversary.

An Optically Generated UWB Local Oscillator can be added through integration of two frequency locked ultra-low phase noise lasers. An optically generated LO eliminates the need for a low phase noise RF LO signal at every antenna element, and provides a much wider LO frequency range, e.g. 1-100 GHz.

Channelizer functionality is an inherent capability of the tunable optical down-conversion Rx-PAS, which provides a tunable single frequency band channelizer. Using a novel system architecture this can be expanded to create a tunable multiple frequency band channelizer, or in the limit a full channelizer.

Receive Phased Array Sensor (Rx-PAS) Optical Architectures

The novel system optical architectures of this invention provide a PIC enabled Rx-PAS that can provide performance required in a future system, e.g. 8 or more simultaneous RF beams with ultra-wide instantaneous bandwidth ($\geq 1$ GHz), a wide operating frequency range (1-40 GHz), high SFDR ($\geq 120$ dB·Hz$^{2/3}$) and low Noise Figure (NF), <10 dB. The Rx-PAS design was validated through system simulations, which are described in the detailed description.

The Multiple Channel Simultaneous Beamforming (MCSB)-PIC device forms the basis of the optical architecture. This MCSB-PIC provides complete optical processing of signals from, e.g. 64 antenna elements in an 8×8 array, including; converting the antenna electrical signal to an RF photonic signal, filtering, time delaying and attenuating that RF signal, generating an LO optical signal—also with appropriate optical filtering (if required), phase control and attenuation, down-converting the required frequency band of the RF signal to baseband (optical down-conversion) by combining the RF and LO signals, then combining all signals to provide a single output for the 64 antenna elements. Multiple simultaneous beamforming is achieved by optically splitting the RF Photonic and LO signals from each antenna element, e.g. a simple 1:8 optical power splitter, and then each of these channels is processed separately by passing through their own set of filters, TTD, attenuators, combining, etc. The use of large scale integration through the silicon photonics platform, utilizing CMOS compatible designs and a CMOS foundry, allows the signal paths to be replicated many times on chip, e.g. 64×, to provide the required functionality on a single PIC device.

A generic Rx-PAS system is shown in FIGS. 1 and 2; the front side of the antenna in FIG. 1 includes 1024 antenna elements (32×32), while the backside of that antenna in FIG. 2 includes 16 wafer scale MCSB-PIC modules tiled across the antenna, each MCSB-PIC supporting 64 antenna elements (8×8). Large size (wafer scale) devices can provide all the required functionality for 64 antenna elements within a single PIC.

Two optical architectures are proposed;

Full Optical System; including two-stage optical multiplexing, e.g. 1024× or 4096×, as shown in FIGS. 3 and 4. In the full optical system, the wavelength division multiplexed signals for each simultaneous channel exit each MCSB-PIC device for a second stage of optical multiplexing in either an array photodetector, or in the proposed novel Group Array Photodetector Combiner (GAPC) device. This two stage multiplexing provides tremendous optical gain, e.g. 1024 optical signals are combined to provide a single RF output, which provides for high system performance.

Modular Hybrid Optical/Digital (MHOD) System; single stage multiplexing, e.g. 64×, as shown in FIG. 5. The MHOD system, which provides all the unique capabilities of the optical approach, with e.g. 64× optical signal multiplexing (less optical gain than the Full Optical System), with the electrical output for each simultaneous channel of each MCSB-PIC device being digitized and processed with a digital signal processor (DSP) before the 16 digital signals for each simultaneous channel are combined to form an Rx-PAS RF output. The DSP can also be utilized to increase the linearity of the system, improving SFDR, by removing the non-linear (sinusoidal) transfer characteristic of the modulators and other nonlinear elements in the optical signal path; this can be accomplished by applying the inverse transfer response in the DSP, i.e. digital post-processing equalization. A similar DSP can be utilized in the full optical system to increase SFDR, however, in that case only one DSP is required per simultaneous beamforming channel.

The MHOD design allows for all optical components and interconnects to be within a single PIC device with no optical inputs or outputs; only electrical connections to the antenna, LO, RF outputs, and control signals are required.

DETAILED DESCRIPTION OF THE PREFERRED EMBODIMENTS

Figure 1:
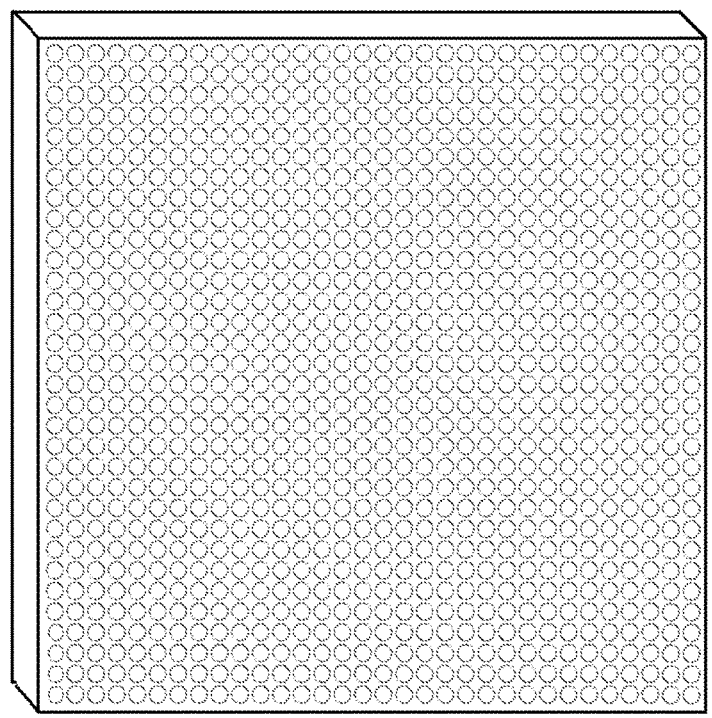
FIG. 1. Example schematic for a Receive Phased Array Sensor (Rx-PAS) showing the antenna side with 32×32 (1024 total) antenna elements FIG. 2. Example schematic for a Rx-PAS showing wafer scaled Multiple Channel Simultaneous Beamforming-Photonic Integrated Circuit (MCSB-PIC) devices (modules) tiled across the back of the antenna; electrically connected to all antenna elements, each MCSB-PIC supporting 8×8 antenna elements (16 MCSB-PICs total).

The embodiment of the Rx-PAS shown in FIGS. 1 and 2 is an example that uses 16 MCSB-PIC modules tiled across the back of an antenna, each MCSB-PIC supporting 64 antenna elements (8×8), with all 16 devices supporting the 1024 element (32×32) PAA. The large size (wafer scale) devices can provide all the required functionality for 64 antenna elements within a single PIC. RF connections are made through the antenna from each antenna element to the appropriate modulator on each MCSB-PIC.

Figure 3:
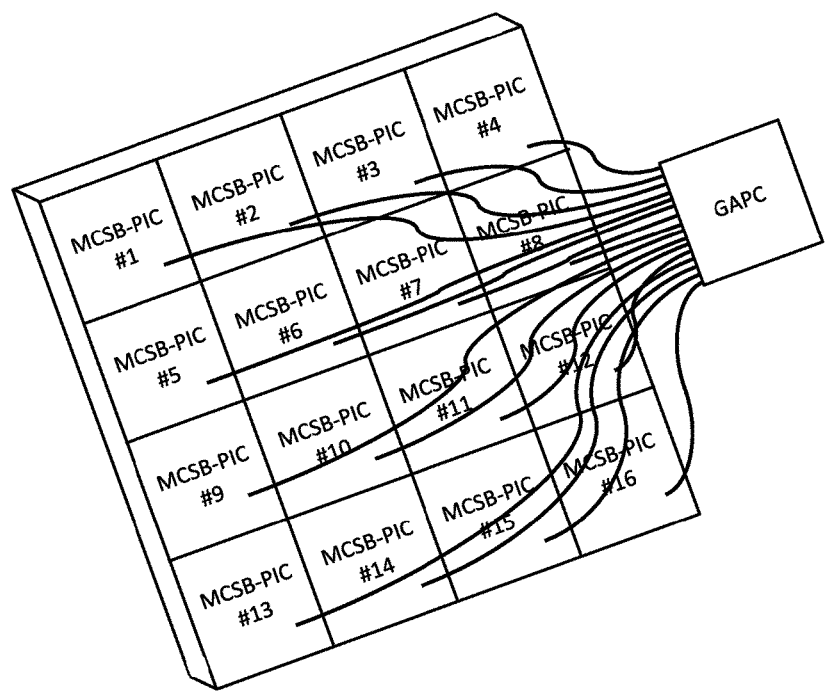
FIG. 3. Rx-PAS system utilizing two stage optical multiplexing; wavelength division multiplexing (WDM) on the first stage followed by a Grouped Array Photodetector Combiner (GAPC) for the second stage.

FIG. 3 shows the Full Optical System, which includes wavelength multiplexing within each MCSB-PIC device to provide a single optical output per beamforming channel, the outputs from all MCSB-PIC devices for each channel being combined in the second stage of optical multiplexing in an array photodetector, such as the proposed GAPC device. WDM on the MCSB-PIC allows the combination of 64 signals, separated in wavelength to avoid noise due to overlapping channels interfering with each other. The array multiplexing for the second stage keeps the WDM signals from each MCSB-PIC on separate photodetector elements, again to eliminate possible interference effects.

Figure 4:
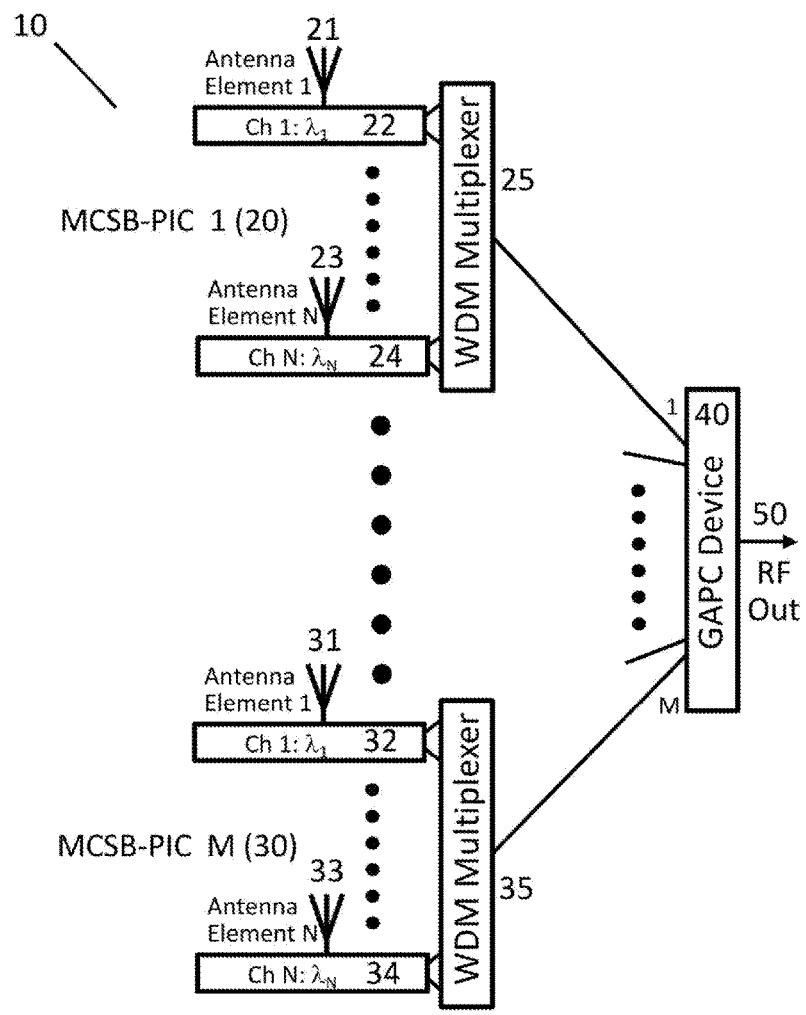
FIG. 4. Schematic of two stage optical multiplexing system, using WDM to combine N optical signals from N antenna elements (for each MCSB-PIC), followed by a GAPC to combine the M multiplexed signals from M separate MCSB-PICs.

A schematic of the 2 stage multiplexing scheme 10 is shown in FIG. 4. Within the first MCSB-PIC, 20, signals from antenna elements 21 and 23 drive the associated wavelength specific channels 22 and 24, the outputs from all channels on the MCSB-PIC 20 being combined in a wavelength division multiplexer 25. Multiple MCSB-PICs form the Rx-PAS system. The final, $M^{th}$ MCSB-PIC, 30, uses signals from antenna elements 31 and 33 to drive the associated wavelength specific channels 32 and 34, the outputs from all channels on this MCSB-PIC 30 being combined in a wavelength division multiplexer 35. Each MCSB-PIC has one optical output per simultaneous beamforming channel, although only one channel is shown in FIG. 4. The outputs from all MCSB-PIC devices for a specific simultaneous beamforming channel are combined within the GAPC device 40, providing a single RF output per simultaneous beamforming channel 50. The GAPC device combines outputs from M MCSB-PIC devices.

Figure 5:
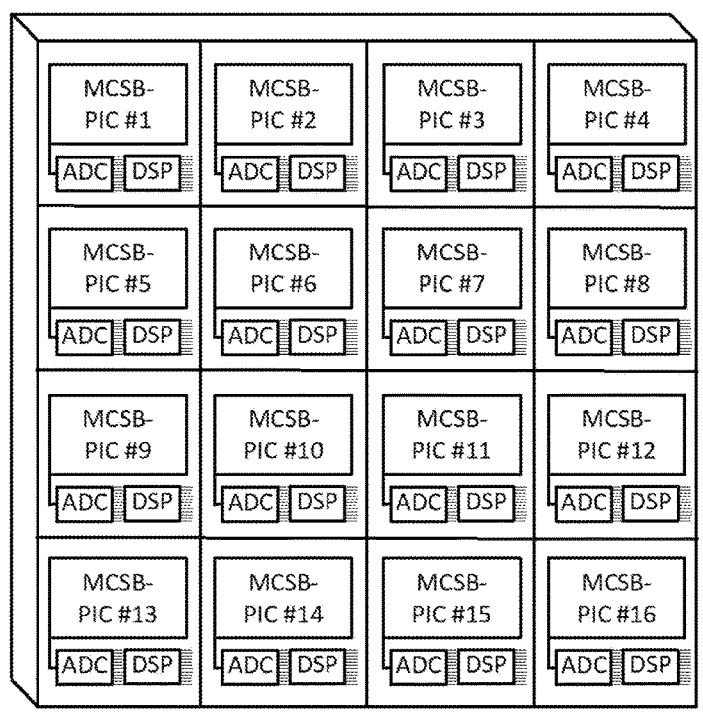
FIG. 5. Modular Hybrid Optical/Digital (MHOD) system schematic; optical beamforming on a single MCSB-PIC (e.g. supporting 8×8 antenna elements), with an analog to digital converter (ADC) and digital signal processing (DSP) per MCSB-PIC beamforming channel, followed by digital beamforming to combine information for all the elements of the array (additional digital beamforming elements not shown).

The MHOD system design is shown schematically in FIG. 5. Instead of two-stage optical multiplexing, in which optical signals must leave each MCSB-PIC to go to the GAPC device, within the MHOD design all optical signals stay on the MCSB-PIC, with only electrical input and output signals. In this case, the MCSB-PIC can include a wavelength division multiplexer to combine all the optical signals (which are at different WDM wavelengths), followed by a photodetector, or a differential (also known as balanced) pair of photodetectors; or the MCSB-PIC can include a GAPC device to combine the many optical signals without concern for their wavelengths, i.e. the channels do not have to be at specific wavelengths. The GAPC device can again be formed of a single array, or a differential pair array.

Figure 6:
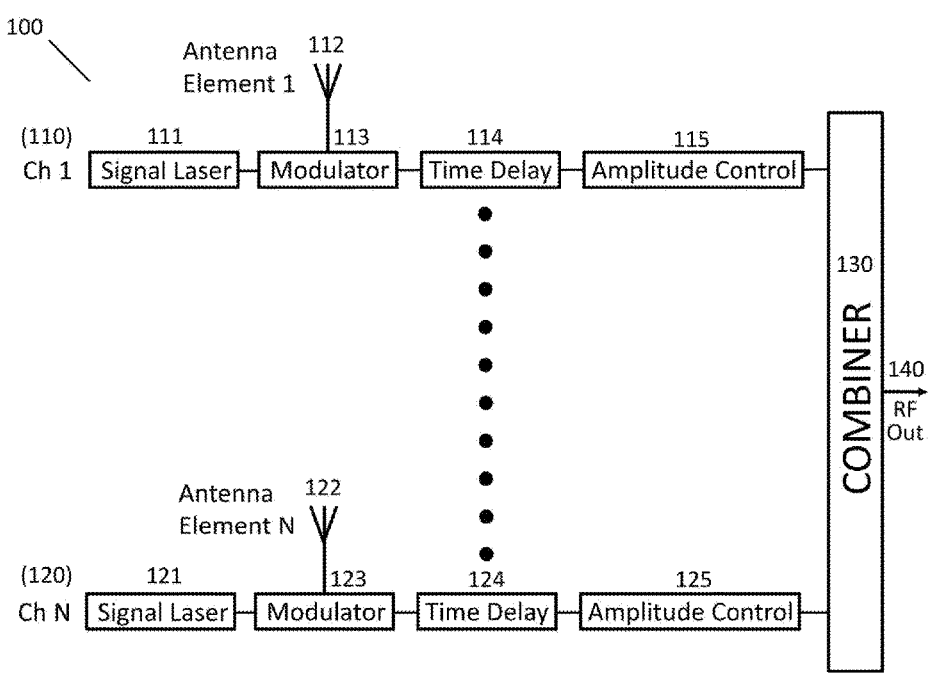
FIG. 6. Basic Rx-PAS system design schematic. One laser and signal channel per antenna element; the laser carrier is modulated by the electrical signal from the antenna element; this signal is time delayed and amplitude controlled; the optical signals from all antenna elements are combined to provide the beamformed output.

FIG. 6 shows an embodiment of the basic Rx-PAS system design 100. The system is made up of N channels, each channel supporting an antenna element. Channel 1, 110, includes a signal laser 111, an antenna element 112 which drives a modulator 113 and modulates the carrier from the laser 111. The modulated optical carrier passes through a tunable time delay device 114, which imparts a chosen time delay on the modulated signal, followed by an amplitude control device, or attenuator 115, which controls the size of the signal. The $N^{th}$ channel, 120, includes signal laser 121, antenna element 122, modulator 123, tunable time delay 124, and amplitude control/attenuator 125. Optical signals from all N channels, providing delayed and attenuated signals associated with N antenna elements, are combined in combiner device 130, providing a single RF beam-formed output 140. The beamforming is chosen by the values of time delay and attenuation for each channel. FIG. 6 shows the basic Rx-PAS system design for a single beamforming channel. The beam-formed RF output of this and other Rx-PAS systems in this invention are typically electrically band-pass filtered, and then passed into an analog to digital converter (ADC), followed by a DSP that is used to process information for that beamforming channel. Digital processing can be utilized to further linearize the system performance, increasing SFDR, counteracting the nonlinearity of components in the systems by applying the inverse characteristic, e.g. the sinusoidal transfer characteristic of the MZI modulator used in most systems can be linearized by providing the inverse transfer characteristic of the modulator.

Figure 7:
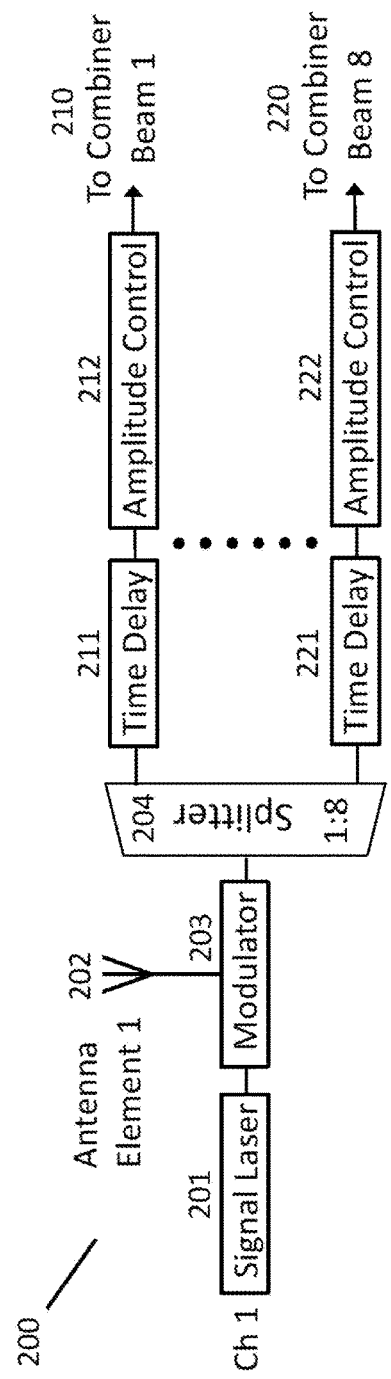
FIG. 7. Shows the use of an Optical Splitter in the Basic Rx-PAS system design to provide multiple simultaneous beamforming, a single optical channel is shown; the optical power splitter provides a set of X identical optical signals (8 shown), which can be independently processed (time delayed, amplitude controlled, and combined) to provide beamforming of X simultaneous and independent beams.

FIG. 7 shows how an optical power splitter can be used to create multiple simultaneous beams. FIG. 7 shows a single channel of the basic Rx-PAS system design shown in FIG. 6, expanded through the use of an optical power splitter, to create multiple output beams, in this example 8 beams. The power splitting scheme for channel 1, 200, includes a signal laser 201, antenna element 202, and modulator 203, which together provide a single modulated optical carrier based on the electrical signal from the antenna element. The modulated optical carrier is split into eight identical optical signals, each the same as the modulated optical carrier but smaller in size, by passing through an optical power splitter 204. Each of these identical optical signals passes through its own time delay device, attenuator, and then goes to the appropriate combiner for the specific output beam. The first of eight outputs from the splitter passes through time delay 211, amplitude control/attenuator 212 and on to the combiner for beam 1, 210. The last of eight outputs from the splitter passes through time delay 221, amplitude control/attenuator 222 and on to the combiner for beam 8, 220. Following the optical power splitter, all elements for each specific beam are the same as would be required for a single beam. The use of the silicon photonics integration platform, using CMOS foundry processing, enables the large scale integration required for this multiple simultaneous beamforming system.

Figure 8:
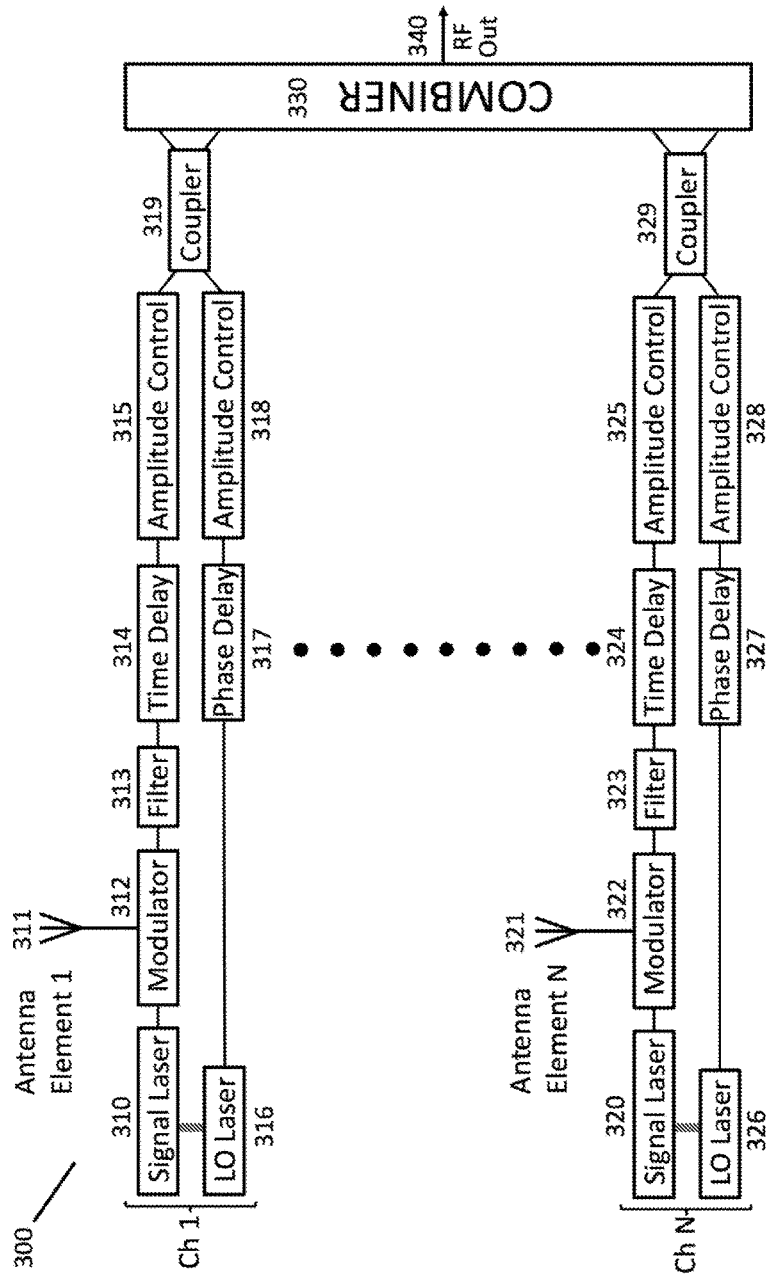
FIG. 8. Rx-PAS system including optical down-conversion to provide the output signal near baseband to utilize high performance ADCs; this design uses 2 locked lasers per channel, one for the antenna optical signal and one for the optical Local Oscillator (LO) to be used for down-conversion.

FIG. 8 shows an extension of the basic Rx-PAS system design 100 to include optical down-conversion within the system. The Down-converting Rx-PAS system 300, includes N channels, supporting N antenna elements, with the outputs from all N channels combined to provide the single beamforming RF output 340. FIG. 8 shows the down-converting Rx-PAS system for a single beamforming channel. The signal laser 310, for channel 1, has the electrical signal from antenna element 311 modulated onto the laser carrier by modulator 312. The frequency band that is required to be down-converted, is selected from the modulated signal using filter device 313; this chosen frequency band signal is then time delayed in time delay device 314, attenuated in amplitude control device 315, and then passes into coupler 319. A separate LO laser is locked to the signal laser with a specific offset frequency; this can be accomplished by frequency locking both lasers to a single ultra-high Q reference filter, each laser locked to a different resonance, with the chosen offset frequency set by the chosen resonances. For channel 1, the offset frequency of the LO laser 316 is chosen to align with the frequency band selected by filter 313, to enable down-conversion. The LO laser output is phase delayed in phase delay device 317, amplitude controlled in attenuator device 318, and then passes into coupler 319. The coupler 319, combines the channel 1 antenna signal and channel 1 LO signal, which replaces the optical carrier of the signal laser (which was removed by filter 313) with the LO signal, effectively creating a down-converted optical signal. The coupler 319, provides two outputs which are out of phase with one another; these are used with differential detection to cancel the relative intensity noise (RIN) effects of the laser and even order distortion products. Each of the N channels support a different antenna element, with the same series of optical elements. The $N^{th}$ channel has a signal laser 320 and LO laser 326, frequency locked with the same offset frequency as channel 1, and all the channels within 300. Antenna element 321 provides the electrical signal for modulator 322, modulating the carrier of the signal laser 320. Filter 323 selects the same frequency band from the modulated signal as filter 313 selected in channel 1. This chosen frequency band signal is then time delayed in time delay device 324, attenuated in amplitude control device 325, and then passes into coupler 329. The LO laser 326 output is phase delayed in phase delay device 327, amplitude controlled in attenuator device 328, and then passes into coupler 329. The coupler 329, combines the channel N antenna signal and channel N LO signal, which replaces the optical carrier of the signal laser (which was removed by filter 323) with the LO signal, effectively creating a down-converted optical signal. The outputs from all N couplers, for all N channels, are combined in the combiner 330, providing a single RF beamforming output 340. The combiner 330 includes a differential pair of combiners, one for each of the two outputs of each coupler.

Figure 9:
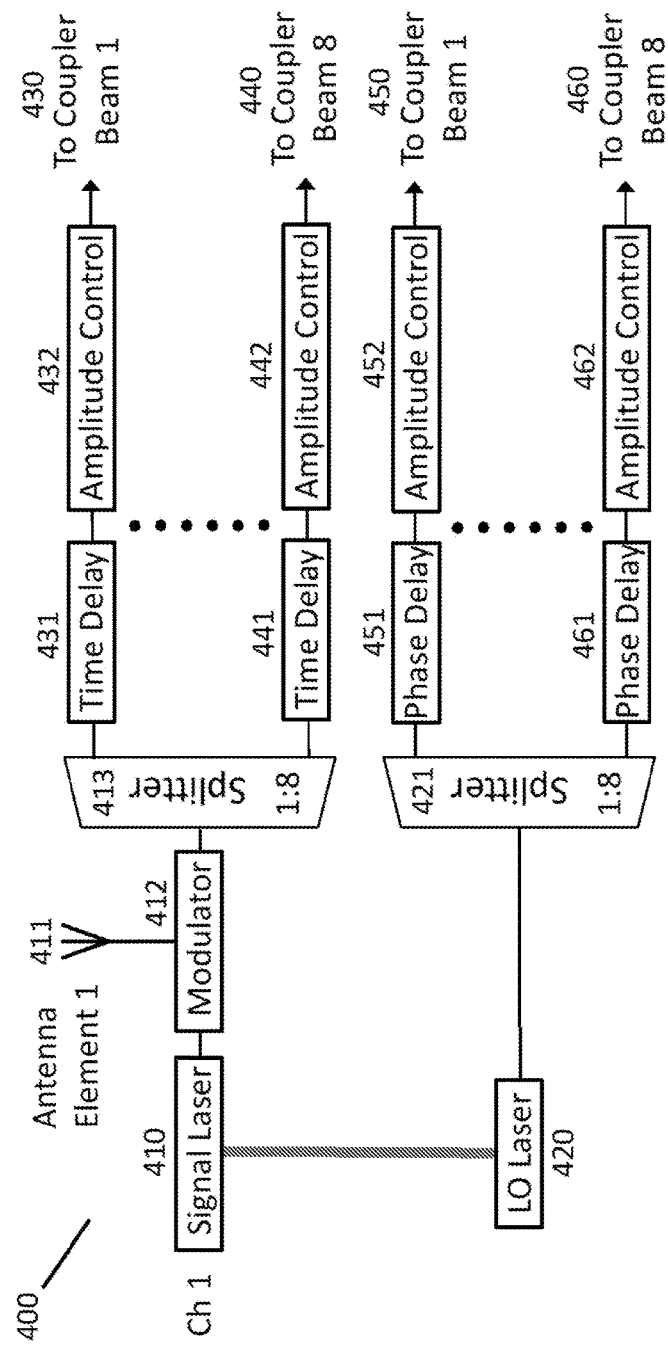
FIG. 9. Shows the use of an Optical Splitter in the Rx-PAS system including optical down-conversion using 2 locked lasers, to provide multiple simultaneous beams (8 shown); a single optical channel is shown.

FIG. 9 shows how optical power splitters can be used to create multiple simultaneous beams for the Down-converting Rx-PAS system shown in FIG. 8. Similar to the power splitting used in the Standard Rx-PAS system (FIG. 7), optical power splitters are used to create identical copies (8 copies in FIG. 9) of both antenna optical signals and LO signals, with these signals then passing through the same parallel set of photonic components to create individual, simultaneous down-converted RF beams. FIG. 9 shows optical power splitting and simultaneous beamforming (8 simultaneous beams) for channel 1 only, supporting a single antenna element; in the full system this is replicated for all N antenna channels. The carrier of the signal laser 410 is modulated by the electrical signal from antenna element 411, using modulator 412, and this modulated optical signal is split into 8 identical modulated optical signals, each the same as the modulated optical carrier but smaller in size, by passing through an optical power splitter 413. Each of these identical optical signals passes through its own time delay device, attenuator, and then goes to the appropriate coupler for the specific output beam. The first of eight outputs from the splitter 413 passes through time delay 431, amplitude control/attenuator 432 and on to the coupler for beam 1, 430. The last of eight outputs from the splitter passes through time delay 441, amplitude control/attenuator 442 and on to the coupler for beam 8, 440. Similarly, the output of the offset frequency locked LO laser 420 is split into 8 identical optical signals, each the same as the LO optical carrier but smaller in size, by passing through an optical power splitter 421. Each of these identical optical signals passes through its own phase delay device, attenuator, and then goes to the appropriate coupler for the specific output beam. The first of eight outputs from the splitter 421 passes through phase delay 451, amplitude control/attenuator 452 and on to the coupler for beam 1, 450. The last of eight outputs from the splitter passes through phase delay 461, amplitude control/attenuator 462 and on to the coupler for beam 8, 460. For the complete system, the couplers from all N channels, for a specific beam (e.g. beam 1), all go into a combiner to provide RF beam output 1. Similarly, combiners for each of the 8 beams provide 8 RF outputs.

Figure 10:
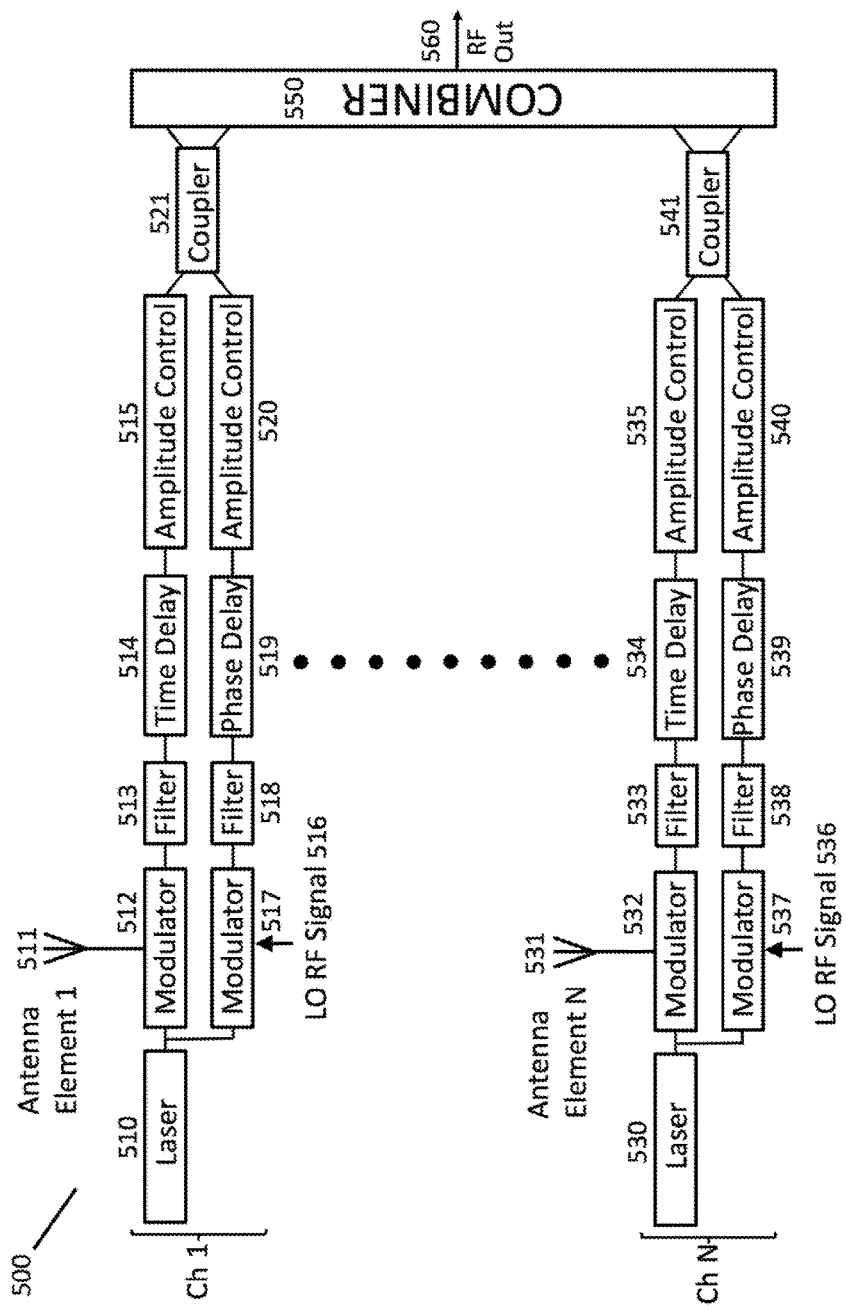
FIG. 10. Rx-PAS system with optical down-conversion using 1 laser which is power split to provide both the antenna signal and LO signal. The LO optical signal is obtained by modulating the laser carrier with an LO RF signal, then filtering off the required optical LO signal.

FIG. 10 shows an alternative design for the Down-converting Rx-PAS system 500, which replaces the two separate locked lasers in FIG. 8 with a single laser that is split to provide the two optical carriers that form the antenna modulated signal and the LO optical signal. Channel 1 includes a single laser 510, the output of which is split in two, with the splitting ratio optimized for best system performance. Part of the laser carrier is modulated by modulator 512, driven by the electrical signal from antenna element 511. The frequency band that is required to be down-converted, is selected from the modulated signal using filter device 513; this chosen frequency band signal is then time delayed in time delay device 514, attenuated in amplitude control device 515, and then passes into coupler 521. The other part of the laser carrier is modulated in modulator 517, using the LO RF signal 516, and then this signal is filtered to select the required LO optical signal by filter 518. The filtered LO optical signal is then phase delayed in phase delay device 519, attenuated in amplitude control device 520, and then passes into coupler 521. Similarly for channel N, the output of laser 530 is split in two, with the splitting ratio optimized for best system performance. Part of the laser carrier is modulated by modulator 532, driven by the electrical signal from antenna element 531. The frequency band that is required to be down-converted, is selected from the modulated signal using filter device 533; this chosen frequency band signal is then time delayed in time delay device 534, attenuated in amplitude control device 535, and then passes into coupler 541. The other part of the laser carrier is modulated in modulator 537, using the LO RF signal 536, and then this signal is filtered to select the required LO optical signal by filter 538. The filtered LO optical signal is then phase delayed in phase delay device 539, attenuated in amplitude control device 540, and then passes into coupler 541. Coupler outputs from all N channels are combined within the combiner 550, providing a single RF beamforming RF output 560. FIG. 10 shows the schematic for a single beamforming channel, as in FIG. 8. This can be extended to create multiple beamforming using optical splitters, similar to that shown in FIG. 9.

Figure 11:
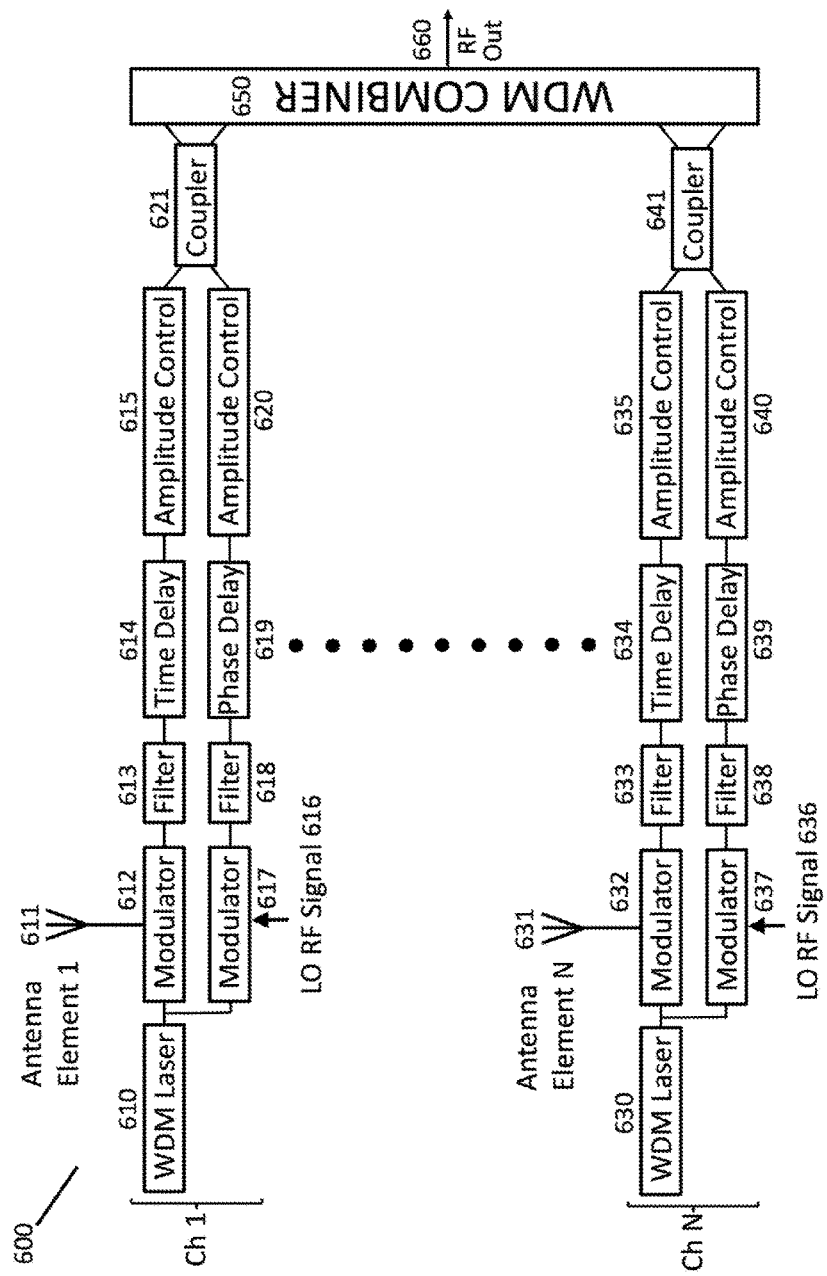
FIG. 11. MCSB-PIC design using wavelength division multiplexing (WDM) for signal combining. The optical multiplexed signal can leave the MCSB-PIC for 2 stage multiplexing, or a photodetector (or differential pair of photodetectors) on the MCSB-PIC can convert the multiplexed optical signal to a single electrical signal.

FIG. 11 shows a similar Down-converting Rx-PAS system design to that in FIG. 10, however, in this case, the N channels utilize N lasers with different and separate wavelengths, and use a wavelength multiplexer in the combiner element, i.e. taking advantage of WDM. Channel 1 includes a single wavelength specific laser (WDM laser) 610, the output of which is split in two, with the splitting ratio optimized for best system performance. Part of the laser carrier is modulated by modulator 612, driven by the electrical signal from antenna element 611. The frequency band that is required to be down-converted, is selected from the modulated signal using filter device 613; this chosen frequency band signal is then time delayed in time delay device 614, attenuated in amplitude control device 615, and then passes into coupler 621. The other part of the laser carrier is modulated in modulator 617, using the LO RF signal 616, and then this signal is filtered to select the required LO optical signal by filter 618. The filtered LO optical signal is then phase delayed in phase delay device 619, attenuated in amplitude control device 620, and then passes into coupler 621. Similarly for channel N, the output of laser 630 is split in two, with the splitting ratio optimized for best system performance. Part of the laser carrier is modulated by modulator 632, driven by the electrical signal from antenna element 631. The frequency band that is required to be down-converted, is selected from the modulated signal using filter device 633; this chosen frequency band signal is then time delayed in time delay device 634, attenuated in amplitude control device 635, and then passes into coupler 641. The other part of the laser carrier is modulated in modulator 637, using the LO RF signal 636, and then this signal is filtered to select the required LO optical signal by filter 638. The filtered LO optical signal is then phase delayed in phase delay device 639, attenuated in amplitude control device 640, and then passes into coupler 641. Coupler outputs from all N channels are combined within the combiner 650, providing a single RF beamforming RF output 660. FIG. 11 shows the schematic for a single beamforming channel, as in FIG. 8. This can be extended to create multiple beamforming RF outputs using optical power splitters, similar to that shown in FIG. 9.

Figure 12:
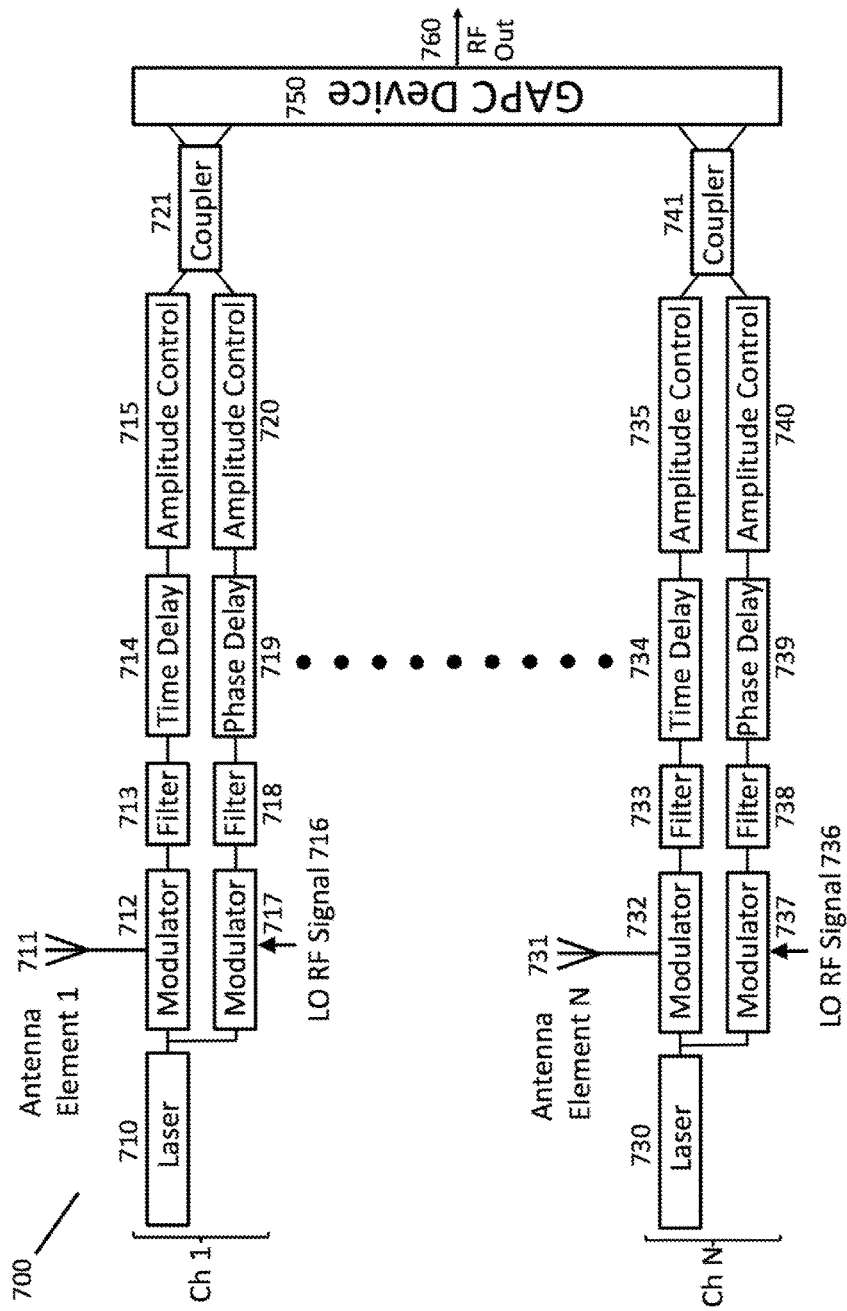
FIG. 12. MCSB-PIC using a single GAPC device for signal combining, providing a single electrical output.

FIG. 12 shows a similar Down-converting Rx-PAS system design to that in FIG. 10, however, in this case, the combiner element is a GAPC device. Channel 1 includes a single non-wavelength specific laser (i.e. specific wavelength is not important, and could be the same, similar, or different for the different channels) 710, the output of which is split in two, with the splitting ratio optimized for best system performance. Part of the laser carrier is modulated by modulator 712, driven by the electrical signal from antenna element 711. The frequency band that is required to be down-converted, is selected from the modulated signal using filter device 713; this chosen frequency band signal is then time delayed in time delay device 714, attenuated in amplitude control device 715, and then passes into coupler 721. The other part of the laser carrier is modulated in modulator 717, using the LO RF signal 716, and then this signal is filtered to select the required LO optical signal by filter 718. The filtered LO optical signal is then phase delayed in phase delay device 719, attenuated in amplitude control device 720, and then passes into coupler 721. Similarly for channel N, the output of the non-wavelength specific laser 730 is split in two, with the splitting ratio optimized for best system performance. Part of the laser carrier is modulated by modulator 732, driven by the electrical signal from antenna element 731. The frequency band that is required to be down-converted, is selected from the modulated signal using filter device 733; this chosen frequency band signal is then time delayed in time delay device 734, attenuated in amplitude control device 735, and then passes into coupler 741. The other part of the laser carrier is modulated in modulator 737, using the LO RF signal 736, and then this signal is filtered to select the required LO optical signal by filter 738. The filtered LO optical signal is then phase delayed in phase delay device 739, attenuated in amplitude control device 740, and then passes into coupler 741. Coupler outputs from all N channels are combined within the GAPC device 750, providing a single RF beamforming RF output 760. FIG. 12 shows the schematic for a single beamforming channel, as in FIG. 8. This can be extended to create multiple beamforming using optical power splitters, as shown in FIG. 9.

Figure 13:
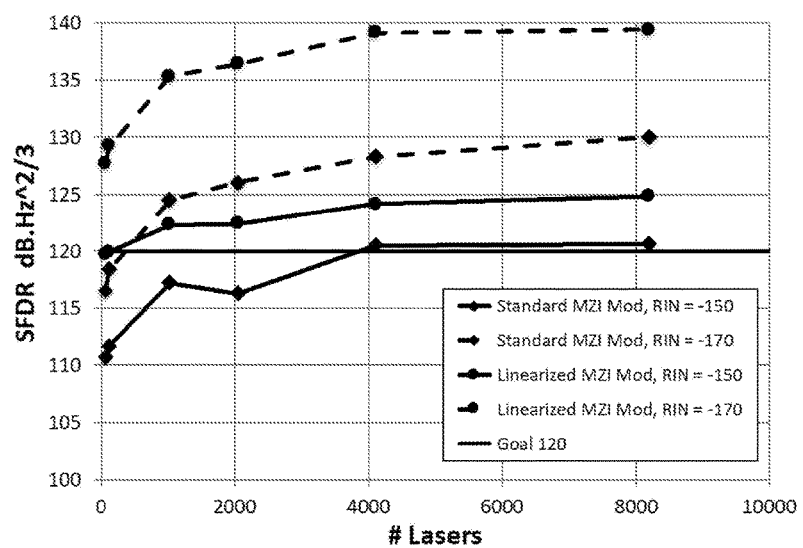
FIG. 13. Simulated spurious free dynamic range (SFDR) versus the number of lasers multiplexed together in the Rx-PAS system (1 or 2 lasers per antenna element). These simulations compare the Rx-PAS system SFDR using either a standard Mach Zehnder interferometer (MZI) modulator or a Linearized MZI modulator, and also using a laser with standard relative intensity noise (RIN) of −150 dB/Hz, or low RIN of −170 dB/Hz. A goal for SFDR of 120 dB·Hz$^{2/3}$ is included in the plot.
Figure 14:
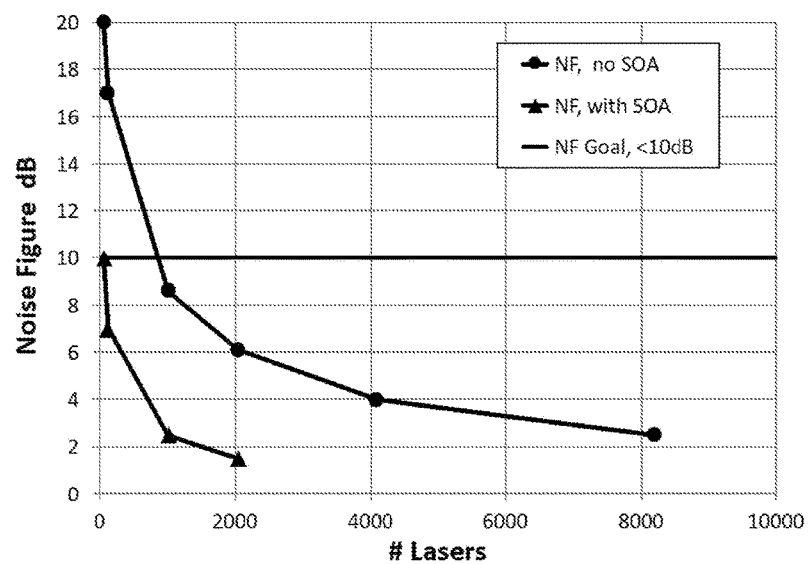
FIG. 14. Simulated noise figure (NF) versus the number of lasers multiplexed together in the Rx-PAS system (1 or 2 lasers per antenna element). The NF is shown for the Rx-PAS system shown in FIG. 3, the system without a semiconductor optical amplifier (SOA), and also for a design including an SOA following each antenna modulator in order to increase the photonic signal level.

Examples of a simulated Down-converting Rx-PAS system performance, based on the 2 stage multiplexing scheme shown in FIGS. 3 and 4, are shown in FIGS. 13 and 14. Calculated SFDR and Noise Figure (NF) are shown versus the total number of lasers in a system (e.g. 64 for a single MCSB-PIC system with 1 laser per channel, and 128 for a single MCSB-PIC system with 2 lasers per channel; larger numbers for 2 stage multiplexing). The simulated system includes a 1:8 optical power splitter in antenna and LO signal arms to provide 8 independent, simultaneous beamforming RF outputs. Results in FIG. 13 show that high SFDR can be reached using a combination of low RIN lasers (or RIN cancellation; which is included through the use of differential photodetectors) and linearized modulators. Low NF is achieved with a larger number of lasers (high multiplexing gain), or the addition of semiconductor optical amplifiers (SOAs) after the antenna modulators to increase the signal power for low numbers of lasers, e.g. for a single MCSB-PIC device. Simulations were carried out without including a low noise amplifier (LNA) at each antenna element (these are a requirement in electronic PAS systems) to show that the system can meet requirements without using LNAs, providing a lower power dissipation system and the potential for ultra-wide bandwidth operation; which is otherwise limited by LNA bandwidth.

Figure 15:
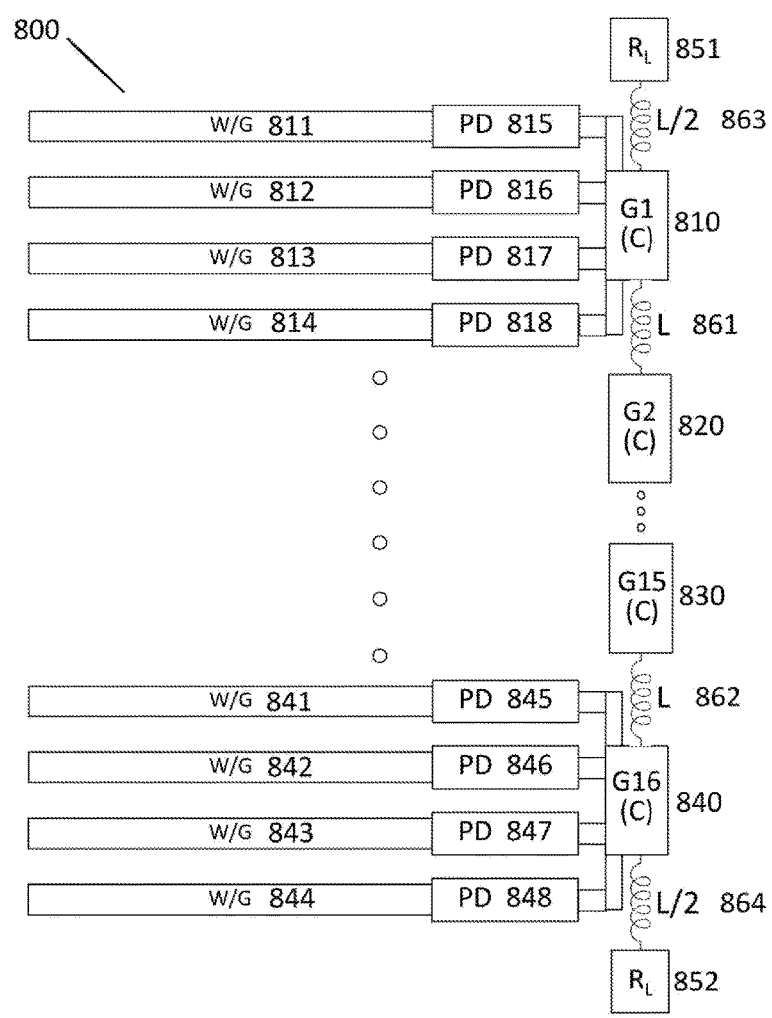
FIG. 15. Schematic of a 64 photodetector GAPC made from 16 Groups of 4 photodetectors. The equivalent circuit for the GAPC includes a capacitance for the Group of photodetectors, C, (plus internal resistance), plus the inductors L and L/2 chosen to create an artificial transmission line.
Figure 16:
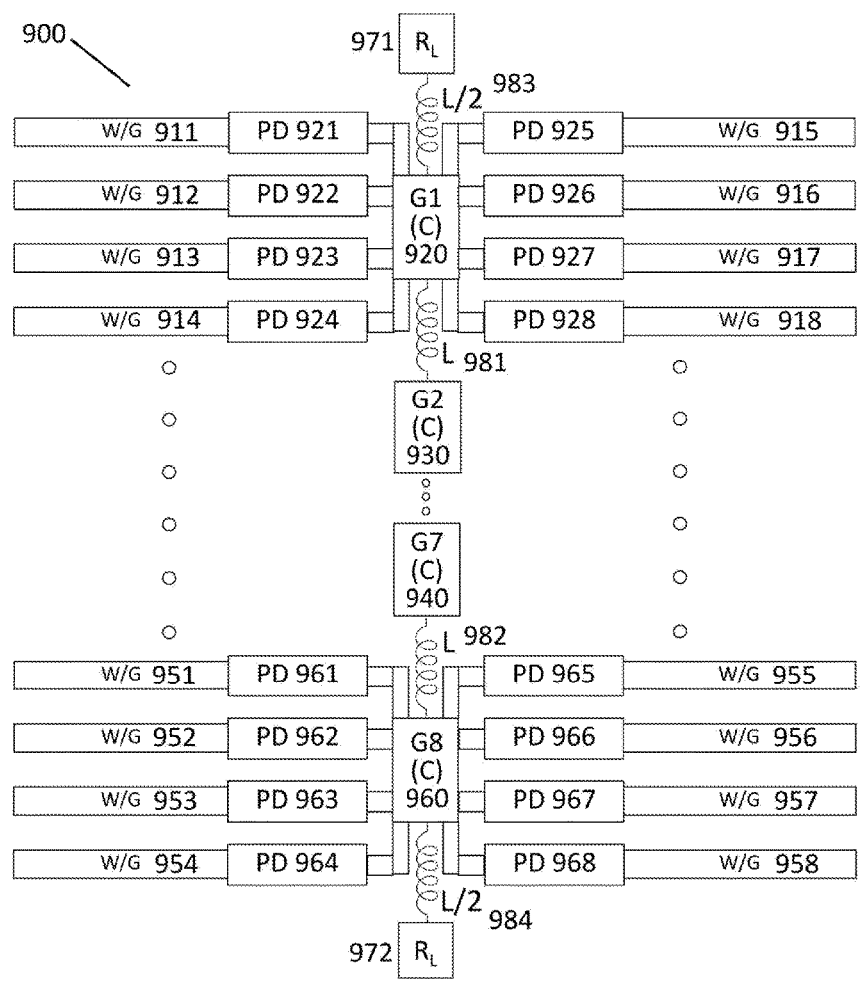
FIG. 16. Schematic of a 64 Photodetector GAPC made from 8 Groups of 8 photodetectors. The equivalent circuit for the GAPC includes a capacitance for the Group of photodetectors, C, (plus internal resistance), plus the inductors L and L/2 chosen to create an artificial transmission line.

A novel extension of the standard travelling wave array photodetector approach is proposed as part of this invention. The Group Array Photodetector Combiner (GAPC) device includes a large number of photodetectors e.g. 64 photodetectors, to combine the RF photonic signals from 64 independent optical inputs, provided on 64 separate waveguides. Within an MCSB-PIC this device can combine the signals from all 64 of the PAS antenna elements. Within this novel approach, the 64 photodetectors are split up into 'Groups' of a smaller number of PDs, e.g. 4 or 8, then these groups are combined within a synthetic transmission line structure to retain the bandwidth of the photodetector groups, to combine all outputs into a single electrical output. The large number of photodetector elements is required to physically separate the absorption volume of each channel, to avoid any interference effects that may occur if channel wavelengths overlap. Schematics for two such GAPC devices are shown in FIGS. 15 and 16. FIG. 15 shows groups of 4 photodetectors, labeled Group 1 (G1) to G16. For individual photodetectors, which have high responsivity, e.g. ~100%, and high speed, e.g. 38 GHz into 50 Ohms, combining a group of 4 devices reduces the −3 dB bandwidth, to somewhat more than ¼ of 38 GHz because only 1 bond pad (capacitance) is used for 4 photodetectors. Similarly, for a Group of 8 photodetectors, the −3 dB bandwidth is still well beyond that required for the Down-converting Rx-PAS. For the Standard Rx-PAS system not including down-conversion, higher bandwidth GAPC devices are required, which will utilize smaller groups of devices as well as higher intrinsic bandwidth photodetectors.

The Groups are connected in the GAPC device with the correct inductance chosen to match the capacitance of the photodetector groups to create a synthetic 50 Ohm transmission line, i.e. Z=sqrt(L/C). With 50 Ohm matching terminations at both ends of the device, the overall matching resistance is 25Ω, increasing the −3 dB bandwidth of the array. For a practical 8×8 GAPC device, using an estimated capacitance from the photodetector active area of 30 fF and that of the single bond pad of 40 fF, the overall Group capacitance is 280 fF (values predicted for the photodetectors in a planned fabrication run). While the capacitance is increased by combining the photodetectors, reducing bandwidth, the series resistance, e.g. 20 Ohms—a typical value for a high speed photodetector, which typically limits the performance and number of elements in a traveling wave photodetector due to RF power loss, is significantly reduced (20/8=2.5Ω) by the parallel photodetectors. This group concept therefore significantly improves the traveling wave approach through the reduced resistance (signal loss), and is useful as long as the overall device bandwidth is sufficient for the application. Using these values for 8 Groups of 8 photodetectors, the bandwidth of the 64 GAPC device into 25Ω is found to be still high, i.e. 20.7 GHz. Additionally, the cutoff frequency for the transmission line is calculated to be 22.7 GHz, using an inductance value, L, of 0.7 nH in this case. This 8×8 GAPC design clearly has significantly more bandwidth than the ~3 GHz flat bandwidth required for a Down-converting Rx-PAS system, and sufficient for a Standard Rx-PAS system operating up to 20 GHz.

Using this novel approach, a very large signal count, low loss, RF photonic combiner can be fabricated, which can combine the 64 signals on the MCSB-PIC, or more in future designs. One advantage of the GAPC is that each photodetector has only one input optical signal, and so the wavelength of the 64 signals does not have to be controlled. Having multiple optical signals as input to one photodetector requires different wavelength signals to avoid coherent effects when the signals are added; leading to the WDM approach option of the MCSB-PIC. Using the 64 channel combiner therefore avoids the need for WDM lasers and a WDM multiplexer in the single stage multiplexing version of the Rx-PAS, e.g. the MHOD system version. The spread of the optical power over many elements (64) also improves the thermal performance of these devices, which is the ultimate limitation in many high power, high speed photodetector applications.

The combiner or GAPC device used in Rx-PAS systems with two coupler outputs, i.e. + and − outputs, will utilize differential photodetector pairs for cancellation of RIN and even order distortion products; in that case, the GAPC designs shown in FIGS. 15 and 16 will be doubled up, to provide one such device for the + coupler outputs and one for the − coupler outputs, the 2 GAPC devices being wired as a differential pair.

Considering the GAPC device 800 shown in FIG. 15, this device is made up of 16 groups of 4 photodetectors. The first group, G1, 810, which has capacitance C, is made up of 4 high speed photodetectors, 815, 816, 817, and 818, with 4 input optical waveguides 811, 812, 813 and 814 respectively. The 4 high speed photodetectors are electrically directly connected to each other, so that their photo-detected currents are combined, and they share one bonding pad shown under the label G1. They therefore act like a single larger photodetector, but with 4 separate (independent) inputs. The device includes 16 groups, from G1 to G16. The last group, G16, is made up of 4 high speed photodetectors, 845, 846, 847, and 848, with 4 input optical waveguides 841, 842, 843 and 844 respectively. The synthetic transmission line is made up of the 16 Groups with capacitance C (and series resistance), matched with 15 inductors L between the groups, 861 between G1 and G2, and 862 between G15 and G16. At the ends of the synthetic transmission line are two load resistors, $R_L$ of typically 50 Ohms, 851 and 852, these load resistors separated from the end Groups by inductors of value L/2, i.e. 863 between $R_L$ and G1, and 864 between $R_L$ and G16. Optical inputs on all (64) waveguide inputs are converted to electrical signals and combined into a single RF output signal, which can be obtained across either load resistor $R_L$.

FIG. 16 shows GAPC device 900, which is made up of 8 groups of 8 photodetectors. The first group, G1, 920, which has capacitance C, is made up of 8 high speed photodetectors, 921, 922, 923, 924, 925, 926, 927 and 928, with 8 input optical waveguides 911, 912, 913, 914, 915, 916, 917 and 918 respectively. The 8 high speed photodetectors are electrically directly connected to each other, so that their photo-detected currents are combined, and they share one bonding pad shown under the label G1. They therefore act like a single larger photodetector, but with 8 separate (independent) inputs. The device includes 8 groups, from G1 to G8. The last group, G8, is made up of 8 high speed photodetectors, 961, 962, 963, 964, 965, 966, 967 and 968, with 8 input optical waveguides 951, 952, 953, 954, 955, 956, 957 and 958 respectively. The synthetic transmission line is made up of the 8 Groups with capacitance C (and series resistance), matched with 7 inductors L between the groups, 981 between G1 and G2, and 982 between G7 and G8. At the ends of the synthetic transmission line are two load resistors, $R_L$ of typically 50 Ohms, 971 and 972, these load resistors separated from the end Groups by inductors of value L/2, i.e. 983 between $R_L$ and G1, and 984 between $R_L$ and G8. Optical inputs on all (64) waveguide inputs are converted to electrical signals and combined into a single RF output signal, which can be obtained across either load resistor $R_L$.

Figure 17:
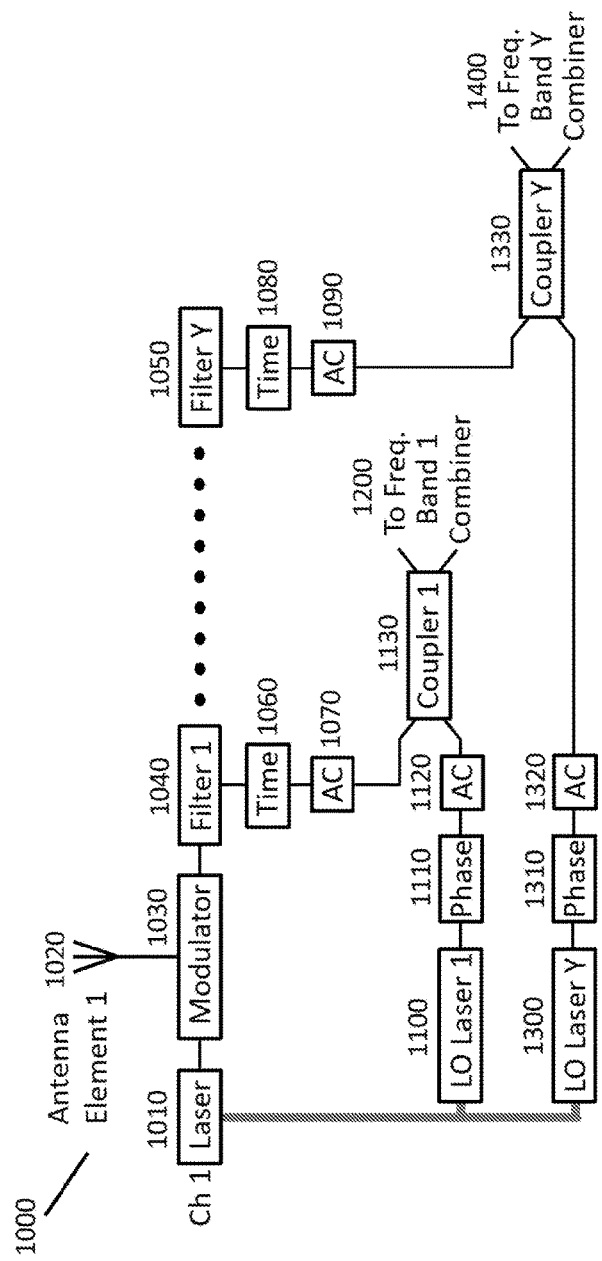
FIG. 17. Shows the extension from a single tunable down-converted channel, which can be used as a tunable single frequency band channelizer, to a multiple tunable frequency band channelizer (in the limit all frequency bands can be down-converted making a full coverage channelizer). In this schematic, only a single optical channel (of N channels) is shown.

This invention provides ultra-wideband, multiple simultaneous beamforming over a wide frequency range, or alternatively it can provide tunable optical down-conversion of a frequency band within the Rx-PAS architecture to convert different RF frequency bands near baseband. This tunable Down-conversion Rx-PAS is equivalent to a tunable, single frequency band RF channelizer, as a frequency band can be chosen and produced at the beamforming RF output. The choice of beamforming parameters can provide a single tunable frequency band RF channelizer with any beam-shape, from a broad beam to look in all directions together, to a narrow aimed channelizer beam-shape. The single tunable frequency band RF channelizer can be expanded to create a multiple tunable frequency band RF channelizer, as shown in FIG. 17, or in the limit when all channels are included, this provides a full RF channelizer. An advantage of using tunable channelizer frequency bands is that fewer ADC and following electronics are necessary when all channels are not populated; reducing overall component size, power and cost. FIG. 17 shows a multiple frequency band RF channelizer schematic, in this case using multiple locked LO lasers to provide the optical LO's for each frequency band (and eliminating the need for many tunable RF LO signals)—extending the locking approach described in FIG. 8. Alternatively, the multiple LOs could be generated from a single laser split into multiple outputs and modulated with an RF LO signal, which for a larger number of LOs could include optical amplification (e.g. with an SOA) to increase the power level of each LO.

Within FIG. 17, channel 1 of a multiple frequency band RF channelizer is shown; 1000. The channel 1 antenna laser 1010 is modulated by the modulator 1030, using the electrical signal from antenna element 1020. The modulated carrier signal passes through a series of tunable filters, the first filter 1040 and the last filter, Filter Y 1050. Each in the series of tunable filters selects a frequency band for down-conversion, and passes the remaining modulated signal along to the next filter in line. Filter 1, 1040, selects a frequency band which passes through time delay device 1060, amplitude control device 1070, and into coupler 1, 1130. The output from LO laser 1, 1100, passes through phase control device 1110, through amplitude control device 1120, and into coupler 1, 1130. Coupler 1 provides + and − outputs for the channel 1 input to a combiner for frequency band 1. This combiner has inputs from + and − coupler outputs of all N channels, and provides a frequency band 1 beam-formed RF output. Each filter and LO pair are combined in a coupler to provide + and − outputs to the combiner for the associated frequency band. In FIG. 17, the last filter, Filter Y 1050, selects a frequency band which passes through time delay device 1080, amplitude control device 1090, and into coupler 1, 1330. The output from LO laser Y, 1300, passes through phase control device 1310, through amplitude control device 1320, and into coupler 1, 1330. Coupler Y provides + and − outputs for the channel Y input to a combiner for frequency band Y. This combiner has inputs from + and − coupler outputs of all N channels, and provides a frequency band Y beam-formed RF output.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. A channelizer system, comprising:
    an array of N antenna receiving elements, where N≥1, that receive a free space radio frequency (RF) signal; the RF signal being a mixture of RF signals coming from all directions;
    wherein each of the receiving elements converts the received RF signal into an antenna element electrical signal;
    a single photonic integrated circuit (PIC), including:
        N optical modulators configured to receive optical carriers from N lasers, the N modulators modulate the optical carriers with the antenna element electrical signal received from a corresponding one of the antenna elements;
        wherein all output optical signals from the N modulators pass through a series of Y tunable filters; each filter in the series of tunable filters selects a frequency band for down-conversion, and passes a remaining modulated signal along to a next filter in the series of tunable filters;
        wherein a signal from each of the filters passes through a corresponding time delay (TD) element, each of the TD elements imparting an individual time delay;
        wherein the TD elements are followed by amplitude controllers that apply individual attenuations; each output of each of the amplitude controllers is combined in one of a set of Y couplers with a local oscillator signal from one of a set of Y local oscillators (LOs);
        wherein output signals from each of the set of LOs pass through a phase and amplitude control device prior to entering the one of the set of Y couplers;
        wherein, via a digital signal processor, all filters, bands, time delays, phase delays, and attenuations are selected to collectively provide from the free space RF signal only a RF signal band with chosen beam forming parameters; and
        wherein output optical signals from one of the set of Y couplers, and corresponding couplers from all other N antenna receiving elements, are combined in a combiner comprising at least one photodetector, said combiner outputting a single electrical output, the amplitude and phase of which comprise information about the RF signal band with chosen beam forming parameters received by the N antenna receiving elements.

2. The system of claim 1, wherein the tunable filters are tunable in a center frequency.

3. The system of claim 1, wherein the tunable filters are tunable in a bandwidth.

4. The system of claim 1, wherein the tunable filters are tunable in a center frequency and a bandwidth.

5. The system of claim 1, wherein the number of tunable filters, Y, is one;
    and wherein via a digital signal processor the tunable filter and corresponding local oscillator frequency are tuned within a bandwidth of the system.

6. The system of claim 1, wherein the number of tunable filters, Y, is greater than one;
    and wherein via a digital signal processor the tunable filters and corresponding local oscillator frequencies are tuned within a bandwidth of the system.

7. The system of claim 1, wherein the number of filters, Y, is equal to a system bandwidth divided by a filter bandwidth, and the filters and associated local oscillators are fixed in frequency and not tunable, each filter selecting a different frequency band for down-conversion.

8. The system of claim 1, wherein different LOs for each of the N antenna receiving elements comprise a local oscillator laser, said local oscillator laser being frequency-locked to a corresponding one of the N lasers.

9. The system of claim 1, further comprising N splitters receiving the optical carriers from the N lasers thus forming N signal channels plus N·Y local oscillator channels; each of the N optical modulators receiving optical inputs in each signal channel;
    further comprising N·Y different local oscillator modulators receiving optical inputs in the LO channels;
    wherein each of the N·Y different local oscillator modulators modulate the optical carrier in the local oscillator channel with a local oscillator RF signal.

10. The system of claim 9, where optical power levels after the N splitters are increased through inclusion of a semiconductor optical amplifier (SOA) before a corresponding modulator.

11. The system of claim 1, wherein the beam forming parameters include a direction defined by polar and azimuthal receiving angles.

12. The system of claim 11, wherein the beam forming parameters include a selected angular spread of the received RF signal.

13. The system of claim 1, wherein the beam forming parameters include a selected angular spread of the received RF signal.

14. The system of claim 1, wherein the output signals from the N modulators and N LO modulators are each split into M identical copies of the output signals and LO signals using an optical power splitter, wherein M≥2, the M copies being used to simultaneously provide M independent RF output signals, each RF output signal having independently chosen beam forming parameters by selecting appropriate time delays and attenuations.

15. The system of claim 1, wherein the combiner is an array of photodetectors.

16. The system of claim 15, wherein the array of photodetectors forms a line of groups of photodetectors; each group including 2 or more photodetectors directly connected to each other; and each group being connected to a next group via an inductor to create an artificial transmission line; forming a Group Array Photodetector Combiner (GAPC) device.

17. The system of claim 1, wherein each of the N lasers generates radiation with a wavelength, $\lambda_N$, being different from wavelengths of all other lasers; and the combiner comprises one or more wavelength division multiplexing (WDM) combiners; the WDM combiner being followed by a Group Array Photodetector Combiner (GAPC) device; the GAPC device combining outputs of multiple WDM combiners.

18. The system of claim 1, wherein each of the N lasers have different wavelengths, and the combiner is a wavelength division multiplexer followed by a single balanced photodetector.

19. The system of claim 1, wherein the system has an antenna with a single receiving element, where N=1.

20. The system of claim 1, wherein the system has an array of N input RF signals, where N≥1; the RF signals being a mixture of RF signals coming from all directions; the N modulators modulate the optical carriers with the corresponding N input RF signals.

* * * * *